(12) United States Patent
Jung et al.

(10) Patent No.: US 8,305,510 B2
(45) Date of Patent: Nov. 6, 2012

(54) LIQUID CRYSTAL DISPLAY DEVICE WITH NOTCHED GATE LINE AND GATE ELECTRODE

(75) Inventors: Jae Moon Jung, Kumi-Shi (KR); Yeong Soo Nam, Taegu-kwangyosshi (KR)

(73) Assignee: LG Display Co., Ltd., Seoul (KR)

( * ) Notice: Subject to any disclaimer, the term of this patent is extended or adjusted under 35 U.S.C. 154(b) by 125 days.

(21) Appl. No.: 12/252,003

(22) Filed: Oct. 15, 2008

(65) Prior Publication Data
US 2009/0046241 A1 Feb. 19, 2009

Related U.S. Application Data

(62) Division of application No. 10/748,699, filed on Dec. 29, 2003, now Pat. No. 7,453,538.

(30) Foreign Application Priority Data

Dec. 31, 2002 (KR) .............................. P2002-87770

(51) Int. Cl.
G02F 1/136 (2006.01)
(52) U.S. Cl. ......................................... 349/46
(58) Field of Classification Search ...................... 349/46
See application file for complete search history.

(56) References Cited

U.S. PATENT DOCUMENTS

| | | | |
|---|---|---|---|
| 6,078,366 A | | 6/2000 | Dohjo et al. |
| 6,130,729 A * | | 10/2000 | Oh et al. ......................... 349/43 |
| 6,249,325 B1 * | | 6/2001 | Ohkawara et al. .............. 349/38 |
| 6,285,418 B1 | | 9/2001 | Ko et al. |
| 6,724,444 B2 | | 4/2004 | Ashizawa et al. |
| 6,882,376 B2 * | | 4/2005 | Kim et al. ...................... 349/43 |
| 6,897,482 B2 | | 5/2005 | Morita et al. |
| 6,900,872 B2 | | 5/2005 | Kang |
| 7,199,850 B2 * | | 4/2007 | Jun .............................. 349/139 |
| 2002/0044229 A1 * | | 4/2002 | Kim .............................. 349/43 |
| 2002/0163602 A1 | | 11/2002 | Lee |

FOREIGN PATENT DOCUMENTS

| | | |
|---|---|---|
| KR | 1997-71088 | 11/1997 |
| KR | 1999-74559 | 10/1999 |

OTHER PUBLICATIONS

Korean Office Action from corresponding Korean Patent Application No. 10-2002-0087770.

* cited by examiner

*Primary Examiner* — Mark Robinson
*Assistant Examiner* — Charles Chang
(74) *Attorney, Agent, or Firm* — Brinks Hofer Gilson & Lione

(57) ABSTRACT

An LCD device has data lines and drain electrodes that are not open at crossing areas overlapped with gate lines and gate electrodes. The LCD device includes a gate line arranged on a substrate and having a portion bent angularly and inwardly; a gate electrode projecting from the gate line; a gate insulating layer on the surface of the substrate; a data line overlapped with some of the bent portion of the gate line, the data line perpendicular to the gate line to define a pixel region; a source electrode projecting from the data line; a drain electrode on the gate insulating layer at a fixed interval from the source electrode; an active layer below the data line, the source electrode and the drain electrode; and a pixel electrode in the pixel region.

11 Claims, 12 Drawing Sheets

LIQUID CRYSTAL DISPLAY DEVICE WITH NOTCHED GATE LINE AND GATE ELECTRODE

Application is a divisional of patent application Ser. No. 10/748,699 filed on Dec. 29, 2003, now U.S. Pat. No. 7,453,538 which claims the benefit of the Korean Application No. P2002-87770 filed on Dec. 31, 2002, which is hereby incorporated by reference.

BACKGROUND OF THE INVENTION

1. Field of the Invention

The present invention relates to a liquid crystal display (LCD) device, and more particularly, to an LCD device and a method for manufacturing the same, in which structures of a gate electrode and a gate line prevent a data line and a drain electrode from being open at crossing areas (step difference) overlapped with the gate line and the gate electrode, respectively.

2. Discussion of the Related Art

Recently, with the increasing development of an information-based society, demands for various display devices have increased. Accordingly, much effort has been expended to research and develop various flat display devices such as liquid crystal display (LCD), plasma display panel (PDP), electroluminescent display (ELD), and vacuum fluorescent display (VFD), and some species of the flat display devices are already applied to displays of various equipment.

Among the various flat display devices, the liquid crystal display (LCD) device has been most widely used due to advantageous characteristics of thinness, lightness in weight, and low power consumption, whereby the LCD device substitutes for Cathode Ray Tube (CRT). In addition to the mobile type LCD devices such as a display for a notebook computer, the LCD devices have been developed for computer monitors and televisions to receive and display broadcasting signals.

Despite various technical developments in the LCD technology with applications in different fields, research in enhancing the picture quality of the LCD device has been in some respects lacking as compared to other features and advantages of the LCD device. In order to use the LCD device in various fields as a general display, the key to developing the LCD device lies on whether the LCD device can implement a high quality picture, such as high resolution and high luminance with a large-sized screen while still maintaining lightness in weight, thinness, and low power consumption.

The LCD device includes an LCD panel for displaying a picture image, and a driving part for applying a driving signal to the LCD panel. The LCD panel includes first and second glass substrates bonded to each other at a predetermined interval, and a liquid crystal layer injected between the first and second glass substrates.

The first glass substrate (TFT array substrate) includes a plurality of gate and data lines, a plurality of pixel electrodes, and a plurality of thin film transistors. The plurality of gate lines are formed on the first glass substrate at fixed intervals in one direction, and the plurality of data lines are formed at fixed intervals in perpendicular to the plurality of gate lines. Then, the plurality of pixel electrodes of a matrix arrangement are respectively formed in pixel regions defined by the plurality of gate and data lines crossing each other. The plurality of thin film transistors are switched according to signals of the gate lines for transmitting signals of the data lines to the respective pixel electrodes.

The second glass substrate (color filter substrate) includes a black matrix layer excluding light from regions except the pixel regions of the first substrate, R/G/B color filter layer displaying various colors, and a common electrode displaying the picture image. Next, a predetermined space is maintained between the first and second glass substrates by spacers, and the first and second substrates are bonded to each other by a sealant. Then, the liquid crystal layer is injected into the inner space of the sealant. When manufacturing an LCD device having the aforementioned structure, a plurality of LCD panels are formed on one large substrate in due consideration of sizes of the LCD panel and the substrate, simultaneously.

More specifically, an LCD device according to the related art will be described as follows.

FIG. 1 is an enlarged plan view illustrating a unit pixel region of an LCD device according to the related art. As shown in FIG. 1, a gate line 1 is formed at a fixed interval in one direction on a lower substrate (not shown), and a gate electrode 1a projects from the gate line 1 in one direction. At this time, a storage lower electrode of a storage capacitor is formed in one body as the preceding gate line 1. That is, the preceding gate line 1 serves as the storage lower electrode.

Then, a gate insulating layer (not shown) is formed on the lower substrate including the gate line 1 and the gate electrode 1a, and a data line 2 is formed on the gate insulating layer for being in perpendicular to the gate line 1, thereby defining a pixel region. Subsequently, a source electrode 2a is projecting from the data line 2, and a drain electrode 2b is formed at a fixed interval from the source electrode 2a. At this time, the source electrode 2a is formed in a '⊂'-shaped hollow, and the drain electrode 2b is formed inside the '⊂'-shaped hollow apart from the source electrode 2a at the fixed interval, whereby a '⊂'-shaped channel region is defined between the source electrode 2a and the drain electrode 2b.

Next, an active layer 3 having a predetermined shape is patterned on the gate insulating layer. In this state, the active layer 3 is formed below the data line 2, the source electrode 2a and the drain electrode 2b to have a size enough for covering the data line 2, the source electrode 2a and the drain electrode 2b. That is, the size of the active layer 3 is larger than a size including the data line 2, the source electrode 2a and the drain electrode 2b. The active layer 3 is formed by sequentially depositing an amorphous silicon layer and $n^+$ amorphous silicon layer. Then, a storage upper electrode 2c is formed at one portion of the preceding gate line 1 serving as the storage lower electrode.

After that, a passivation layer (not shown) is formed on an entire surface of the lower substrate, the passivation layer having a first contact hole 4a at one portion of the drain electrode 2b, and a second contact hole 4b at one portion of the storage upper electrode 2c. Then, a pixel electrode 5 is formed in the pixel region that is in contact with the drain electrode 2b through the first contact hole 4a, and in contact with the storage upper electrode 2c through the second contact hole 4b. Subsequently, a conductive layer is deposited on the gate insulating layer, and then a wet-etch process is performed thereto, thereby forming the data line 2, the source electrode 2a and the drain electrode 2b.

However, the LCD device and the method for manufacturing the same according to the related art have the following disadvantages.

When the gate electrode 1a is shifted, an overlapped crossing area between the gate line 1 and the data line 2 is changed, whereby signal distortion may be generated by a change in the capacitance Cgd. Also, as shown in 'A' region of FIG. 1, when patterning the data line, the source electrode and the drain electrode by the wet-etch process, the crossing area (step difference) between the gate line 1 and the data line 2 has a narrow width (arrow ←→). As a result, the data line 2 of the crossing area may be corroded by the etchant, thereby generating disconnection of the lines.

Furthermore, as shown in 'B' region of FIG. 1, since an overlap area (step difference) between the gate electrode 1*a* and the drain electrode 2*b* has a narrow width (arrow ←→), the drain electrode 2*b* of the overlap area may be corroded by the etchant, thereby generating disconnection.

SUMMARY OF THE INVENTION

Accordingly, embodiments of the present invention include a liquid crystal display device and a method for manufacturing the same that substantially obviates one or more problems due to limitations and disadvantages of the related art.

Embodiments of the present invention provide a liquid crystal display device and a method for manufacturing the same, in which structures of a gate electrode and a gate line prevent the data line and a drain electrode from being open at crossing areas (step difference) overlapping with the gate line and the gate electrode, respectively.

The embodiments also provide a liquid crystal display device and a method for manufacturing the same, which prevent signal distortion by minimizing changes in the gate-drain capacitance Cgd.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages, as embodied and broadly described herein, in one embodiment an LCD device comprises: a substrate; a gate line arranged in one direction on the substrate and having a predetermined portion bent angularly and inwardly; a gate electrode projecting from the gate line; a gate insulating layer disposed on the substrate; a data line overlapping some of the bent portion of the gate line, the data line perpendicular to the gate line to define a pixel region; a source electrode projecting from the data line; a drain electrode on the gate insulating layer at a fixed interval from the source electrode; an active layer below the data line, the source electrode and the drain electrode; and a pixel electrode in the pixel region.

At least a section of the bent portion of the gate line may be curved.

The LCD active layer may overlap an upper side of the gate electrode and predetermined portions of the source and drain electrodes.

The data line may comprise formed of a metal having at least one of chrome Cr, molybdenum Mo, titanium Ti, tantalum Ta, and a molybdenum Mo alloy containing MoW, MoTa or MoNd.

The pixel electrode may comprise Indium-Tin-Oxide ITO, Indium-Zinc-Oxide IZO or Indium-Tin-Zinc-Oxide ITZO.

The LCD device may further comprise a passivation layer on an entire surface of the substrate, the passivation layer having a first contact hole at one portion of the drain electrode. The passivation layer may comprise at least one of an inorganic insulating material and an organic insulating material.

In another embodiment an LCD device comprises: a substrate; a gate line arranged in one direction on the substrate, the gate line having a predetermined portion bent angularly and inwardly; a gate electrode projecting from the gate line, the gate electrode having a predetermined portion bent angularly and inwardly; a gate insulating layer disposed on a surface of the substrate; a data line overlapped with some of the bent portion of the gate line, the data line disposed perpendicular to the gate line to define a pixel region; a source electrode projecting from the data line; a drain electrode formed at a fixed interval from the source electrode, the drain electrode overlapped with the bent portion of the gate electrode; an active layer below the data line, the source electrode and the drain electrode; and a pixel electrode in the pixel region.

At least a section of the bent portion of the gate line may be curved and/or at least a section of the bent portion of the gate electrode may be curved.

In another embodiment, a method for manufacturing an LCD device comprises: forming a gate line arranged in one direction on a substrate, the gate line having a predetermined portion bent angularly and inwardly; forming a gate electrode projecting from the gate line; sequentially depositing a gate insulating layer, a semiconductor layer and a conductive layer on the substrate including the gate line; etching the conductive layer to form a data line overlapped with some of the bent portion of the gate line, thereby defining a pixel region, the data line perpendicular to the gate line; forming a source electrode projecting from the data line; forming a drain electrode at a fixed interval from the source electrode on the gate insulating layer; forming an active layer by etching the semiconductor layer with the data line, the source electrode and the drain electrode as a mask; and forming a pixel electrode in the pixel region.

A predetermined portion of the gate electrode may be bent angularly and inwardly.

The drain electrode may be overlapped with some of the bent portion of the gate electrode.

At least a section of the bent portion of the gate line may be curved and/or at least a section of the bent portion of the gate electrode may be curved.

The drain electrode may be overlapped with some of the bent portion of the gate electrode.

In another embodiment, an LCD device comprises: a substrate; a gate line arranged in one direction on the substrate; a gate electrode projecting from a first side of the gate line; a gate insulating layer disposed on the substrate; a data line perpendicular to the gate line, thereby defining a pixel region; a source electrode projecting from the data line; a drain electrode on the gate insulating layer at a fixed interval from the source electrode; an active layer below the data line, the source electrode and the drain electrode; and a pixel electrode in the pixel region, wherein a boundary of a second side of the gate line opposing the first side, and disposed in a portion of the gate line that overlaps the data line, is greater than a width of the data line.

A boundary of the gate electrode that overlaps the drain electrode may be greater than a width of the drain electrode.

A notch may be formed in the gate line, and at least a portion of the boundary may define a portion of the notch. At least a section of the notch may be disposed directly opposite to the gate electrode. An edge of the notch may be aligned with an edge of the gate electrode. The edge of the notch and the edge of the gate electrode may be non-parallel with an edge of a portion of the gate line in which the notch is not formed. The edge of the notch and the edge of the gate electrode may be parallel with an edge of the data line. A width of the notch may be less than a width of the gate electrode. A length of the notch may be less than a length of the gate electrode.

In another embodiment, an LCD device comprises: a substrate; a gate line arranged in one direction on the substrate; a gate electrode projecting from one side of the gate line; a gate insulating layer disposed on the substrate; a data line perpendicular to the gate line, thereby defining a pixel region; a source electrode projecting from the data line; a drain electrode on the gate insulating layer at a fixed interval from the source electrode; an active layer below the data line, the source electrode and the drain electrode; and a pixel electrode in the pixel region, wherein a capacitance formed by a total overlap between the gate line and the data line and one of between the gate electrode and the data line and between the gate electrode and the source electrode remains substantially constant with movement of the gate line in a direction of a width of the data line.

A boundary of the gate electrode that overlaps the drain electrode may be greater than a width of the drain electrode.

A notch formed in the gate line may decrease the capacitance between the gate line and the data line and substantially compensate for the capacitance between one of between the gate electrode and the data line and between the gate electrode and the source electrode. At least a section of the notch may be disposed directly opposite to the gate electrode. An edge of the notch may be aligned with an edge of the gate electrode. The edge of the notch and the edge of the gate electrode may be non-parallel with an edge of a portion of the gate line in which the notch is not formed. The edge of the notch and the edge of the gate electrode may be parallel with an edge of the data line. A width of the notch may be less than a width of the gate electrode. A length of the notch may be less than a length of the gate electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the embodiments of the invention. In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Hereinafter, an LCD device and a method for manufacturing the same according to the embodiments of the present invention will be described as follows. In the LCD device according to embodiments of the present invention, pattern shapes and structures of a gate electrode and a gate line are changed and prevent a data line from being open at a crossing area between the gate and data lines, and a drain electrode from being open at an overlap area between gate and drain electrodes.

First Embodiment

Figure 2A:
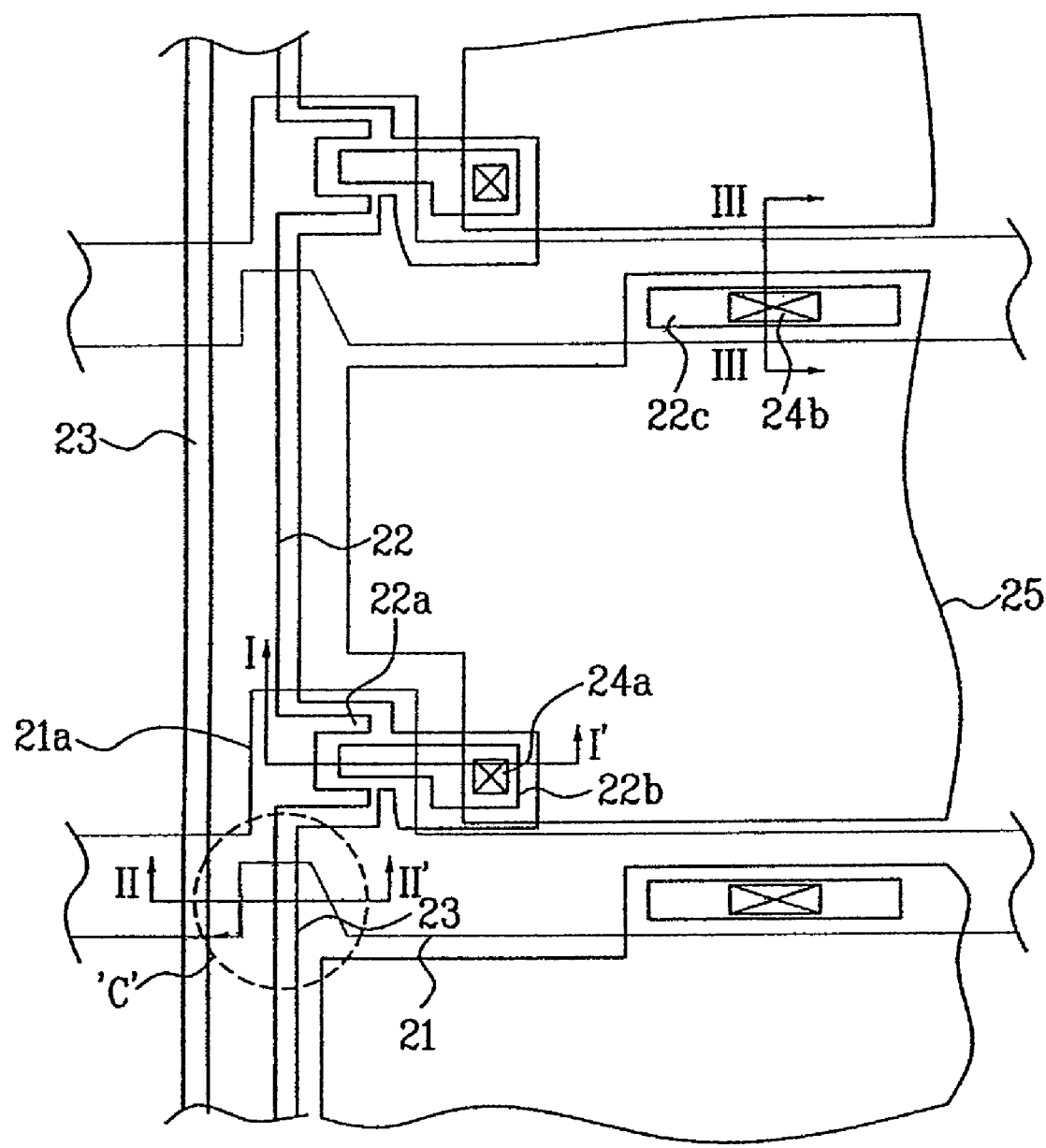
FIGS. 2A and 2B are an enlarged plan view and cross-sectional view illustrating a unit pixel region of an LCD device according to the first embodiment of the present invention.
Figure 2B:
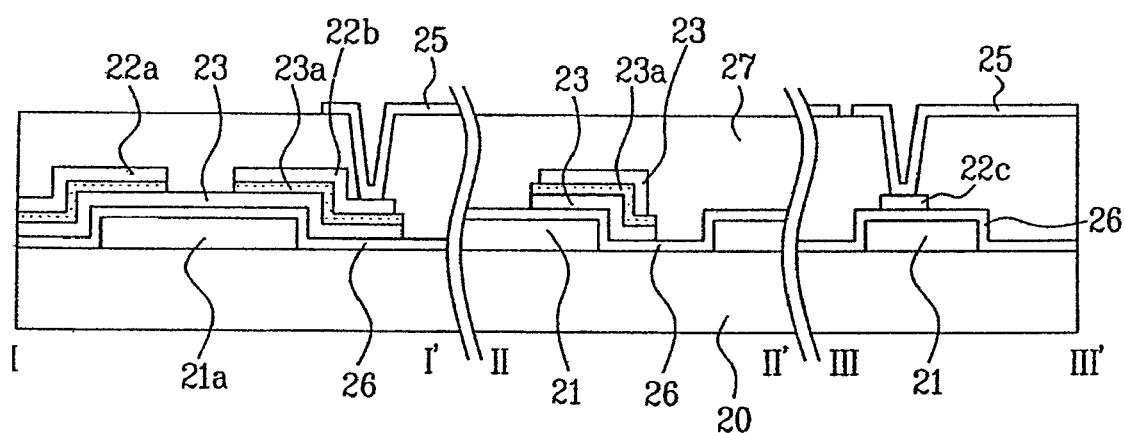
Figure 3A:
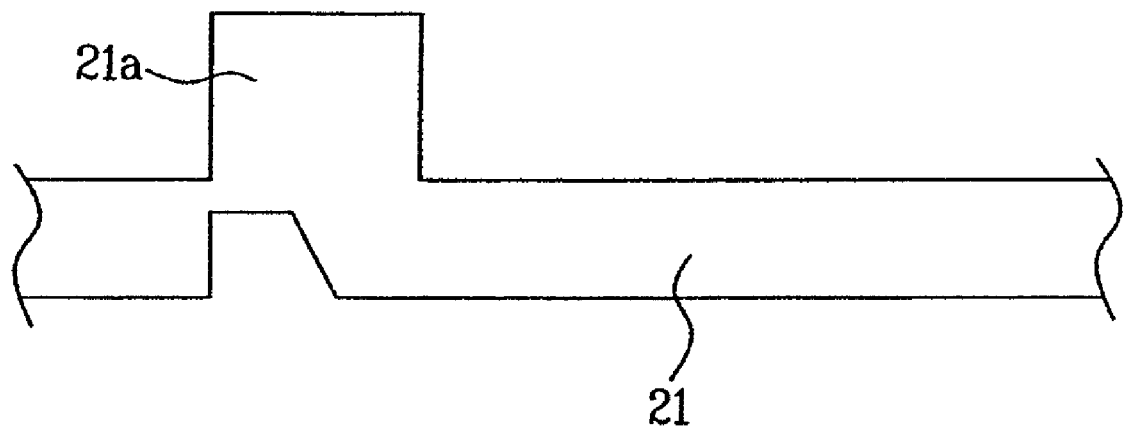
FIG. 3A to FIG. 3C are cross-sectional views illustrating manufacturing process steps of an LCD device according to the first embodiment of the present invention.
Figure 3A:
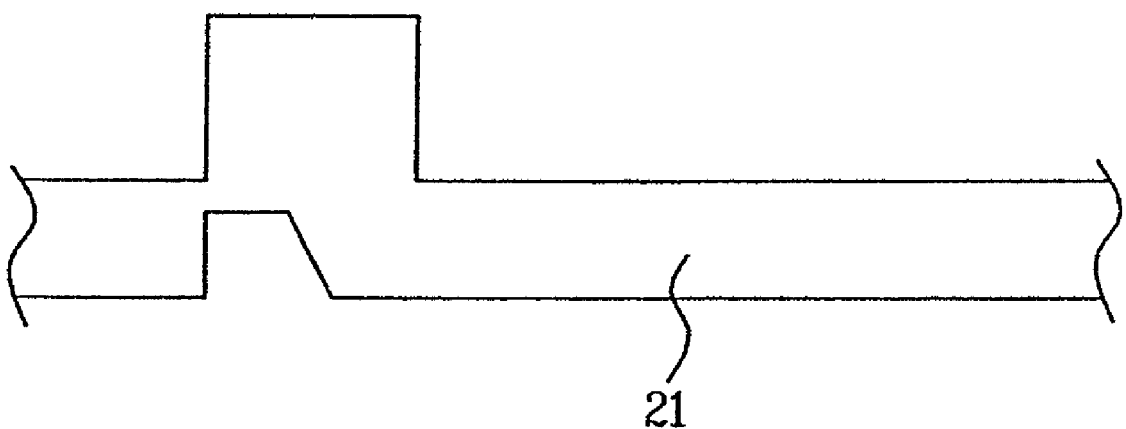
Figure 3B:
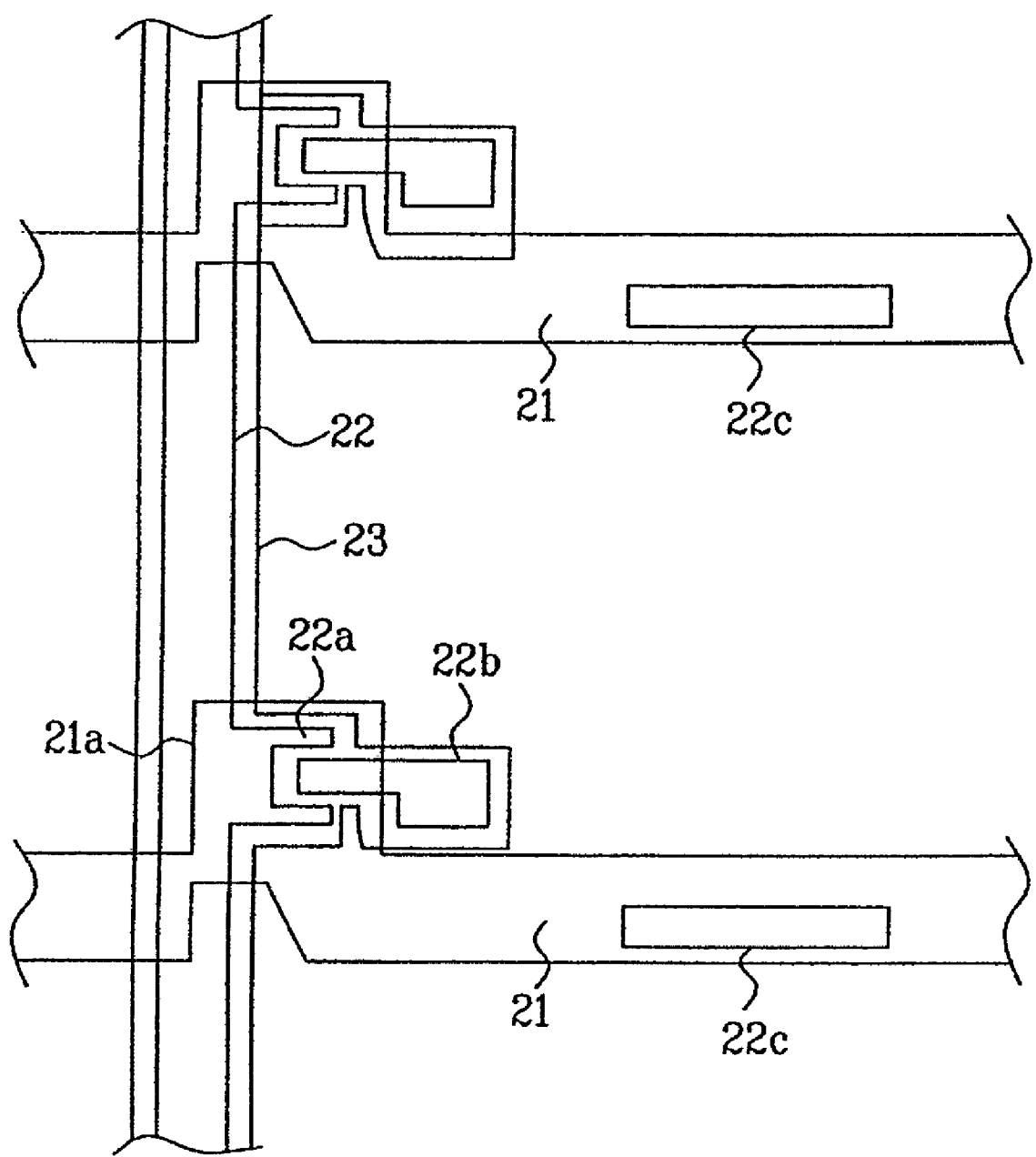
Figure 3C:
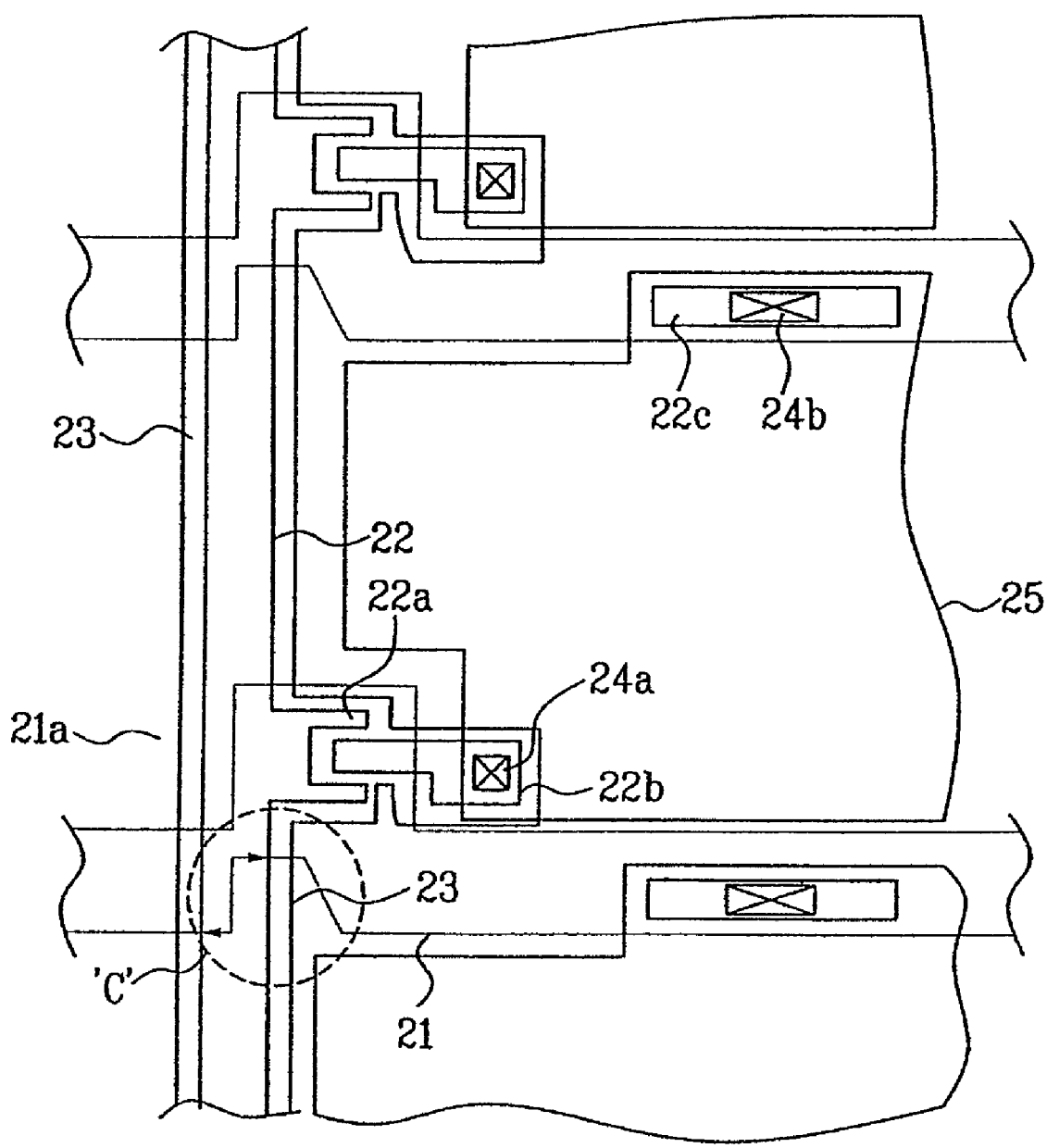

FIGS. 2A and 2B are enlarged plan and cross-sectional views illustrating a unit pixel region of an LCD device according to the first embodiment of the present invention. FIG. 3A to FIG. 3C are cross-sectional views illustrating manufacturing process steps of an LCD device according to the first embodiment of the present invention.

As shown in FIGS. 2A and 2B illustrating the unit pixel region of the LCD device according to the first embodiment of the present invention, a gate line 21 is arranged at a fixed interval in one direction on a transparent lower substrate 20, and a gate electrode 21a projects from the gate line 21 in another direction. At this time, a storage lower electrode of a storage capacitor is formed in one body as the preceding gate line 21. That is, the preceding gate line 21 serves as the storage lower electrode. Then, a gate insulating layer 26 is formed on the transparent lower substrate including the gate line 21 and the gate electrode 21a. Also, a data line 22 is formed on the gate insulating layer 26 perpendicular to the gate line 21, thereby defining a pixel region.

Figure 1:
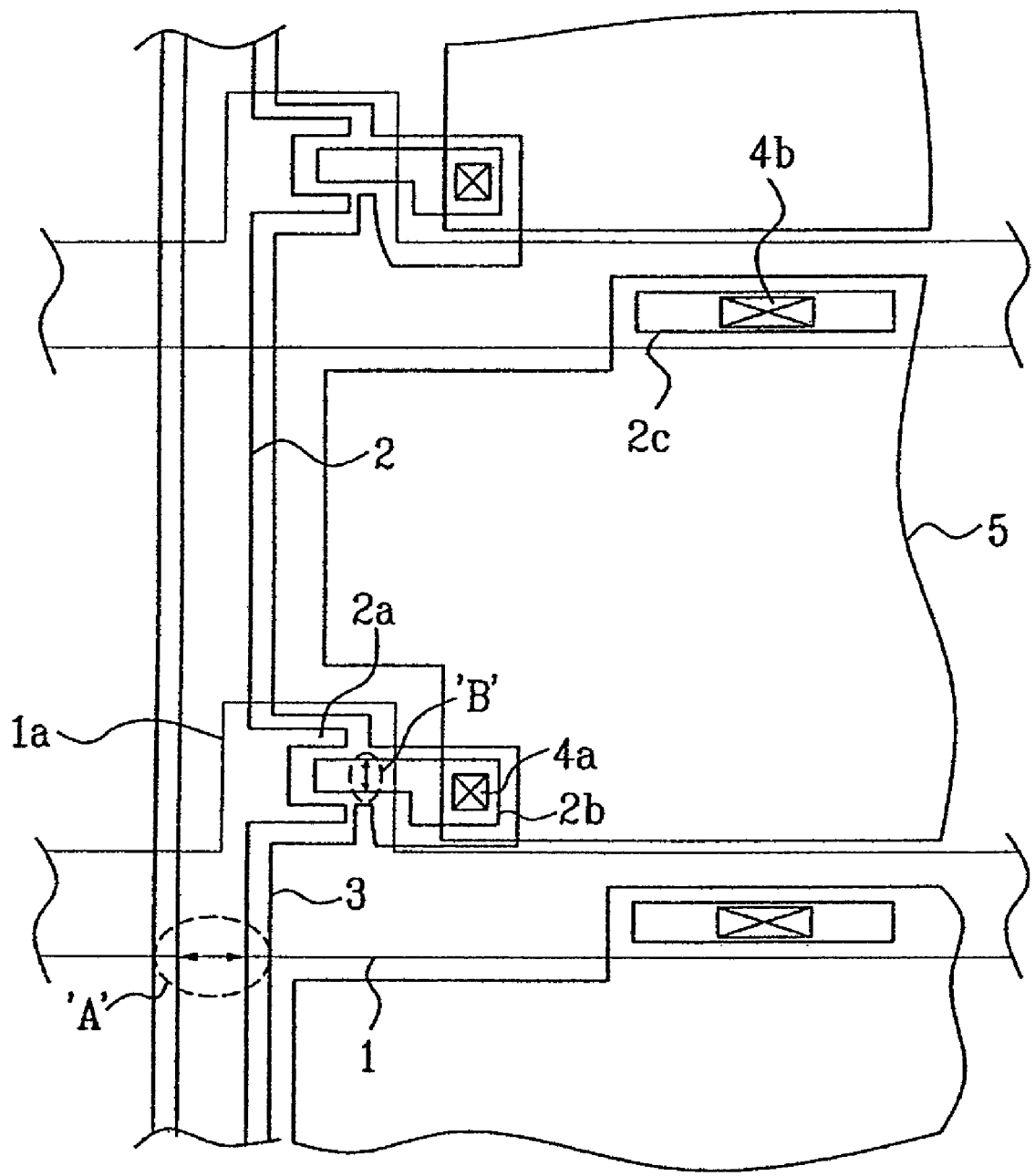
FIG. 1 is an enlarged plan view illustrating a unit pixel region of an LCD device according to the related art.

As shown, the gate line 21 is bent angularly and inwardly at a lower crossing boundary (step difference) between the gate and data lines 21 and 22. The gate line 21 may be formed in a curved line at the lower crossing boundary or both sides may be bent angularly and inwardly, rather than one side being substantially straight and parallel with the data lines 22. On comparing the 'C' region of FIG. 2 to the 'A' region of FIG. 1, the lower crossing boundary between the gate and data lines 21 and 22 in the unit pixel of the LCD device according to the first embodiment is longer than that of the related art. In the portion of the gate line 21 that is bent angularly and inwardly, some parts are overlapped with the data line 22, and the rest are not overlapped with the data line 22.

In the aforementioned structure of the LCD device, even though the gate electrode 21a is shifted, it is possible to compensate the crossing area between the gate and data lines 21 and 22 due to the bent portion of the lower crossing boundary, thereby minimizing Cgd changes. Also, a source electrode 22a projects from the data line 22, and a drain electrode 22b is formed at a fixed interval from the source electrode 22a. The source electrode 22a is formed in a '⊂'-shaped hollow, and the drain electrode 22b is formed inside the '⊂'-shaped hollow separated from the source electrode 22a by the fixed interval, whereby a '⊂'-shaped channel region is defined between the source electrode 22a and the drain electrode 22b.

Also, an active layer 23 having a predetermined shape is patterned on the gate insulating layer 26. The active layer 23 is formed below the data line 22, the source electrode 22a and the drain electrode 22b and is wider than the data line 22, the source electrode 22a and the drain electrode 22b. That is, the size of the active layer 23 is larger than the size of the data line 22, the source electrode 22a and the drain electrode 22b combined. The active layer 23 is formed by sequentially depositing an amorphous silicon layer and $n^+$ amorphous silicon layer. Then, a storage upper electrode 22c is formed at one portion of the preceding gate line 21 serving as the storage lower electrode.

Next, a passivation layer 27 is formed on an entire surface of the transparent lower substrate 20. The passivation layer 27 has a first contact hole 24a at one portion of the drain electrode 22b and a second contact hole 24b at one portion of the storage upper electrode 22c. Then, a pixel electrode 25 is formed in the pixel region that is in contact with the drain electrode 22b through the first contact hole 24a and in contact with the storage upper electrode 22c through the second contact hole 24b. The data line 22 is formed of one or more conductive materials such as chrome Cr, molybdenum Mo, titanium Ti and tantalum Ta, or molybdenum Mo alloys such as MoW, MoTa and MoNd. The passivation layer 22 is formed of an inorganic insulating material such as silicon nitride $Si_3N_4$ or silicon dioxide $SiO_2$, or an organic insulating material such as acrylic organic compound, Teflon, Benzocyclobuten BCB, Cytop or Perfluorocyclobutane PFCB. Also, the pixel electrode 25 is formed of any one of Indium-Tin-Oxide ITO, Indium-Zinc-Oxide IZO, and Indium-Tin-Zinc-Oxide ITZO.

A method for manufacturing the aforementioned LCD device according to the first embodiment of the present invention will be described as follows.

As shown in FIG. 3A, one or more conductive material such as chrome Cr, aluminum Al, aluminum alloy AlNd, tantalum Ta and molybdenum Mo is deposited on the lower substrate (20 in FIG. 2A although not shown in FIG. 3A), and then a patterning process is performed thereon with a first mask by photolithography, thereby forming the gate line 21 arranged in one direction, and the gate electrode 21a projecting from the gate line 21 in another direction. The gate line 21 is inwardly bent at the lower crossing boundary between the gate line 21 and the data line 25 (i.e. bent towards the gate electrode 21a), so that the lower crossing boundary increases in distance. This increases the length of the lower crossing boundary by up to about the width of the gate line 21. As a result, it is possible to prevent the data line from being corroded at the crossing area overlapping the gate line 21 by an etchant, thereby preventing disconnection of the lines. As described above, the gate line 21 may be formed in other shapes, such as a curved line, at the lower crossing boundary.

In addition, the conductive metal layer may have a dual-layered structure having lower and upper layers. For example, the lower layer of the conductive metal layer may be formed of Al or AlNd, and the upper layer of the conductive metal layer formed of Mo. Or, the lower layer of the conductive metal layer may be formed of Cr, and the upper layer of the conductive metal layer formed of AlNd. After that, the gate insulating layer 26 is formed on the entire surface of the lower substrate including the gate line 21.

Referring to FIG. 3B, the amorphous silicon layer (not shown) and $n^+$ amorphous silicon layer (not shown) are sequentially deposited on the gate insulating layer and form the active layer. Then, a second conductive layer is formed on the entire surface of the lower substrate. The conductive layer is formed of one or more metals such as chrome Cr, molybdenum Mo, titanium Ti or tantalum Ta, or is formed of any one of the molybdenum Mo alloys such as MoW, MoTa and MoNd. A photoresist layer (not shown) is formed on the second conductive layer, the photoresist layer is exposed and developed by using a second mask so that the photoresist layer in a channel region is thinner than in other regions. The second mask is a half tone mask. After that, the second conductive layer is wet etched by using the patterned photoresist layer as mask to form the data line 22, the source electrode 22a, the drain electrode 22b and the storage upper electrode 22c. Next, a dry-etch process is performed on the amorphous silicon layer and $n^+$ amorphous layer, thereby forming the active layer 23. The patterned photoresist layer in the channel region is removed by ashing and then the second conductive layer and the $n^+$ amorphous silicon layer in the channel region is etched using the ashed photoresist layer as a mask, thereby forming the source and drain electrodes 22a and 22b and an ohmic contact layer (23a in FIG. 2B).

At this time, the source electrode 22a is formed in the '⊂'-shaped hollow on the gate electrode 21a, and the drain electrode 22b is formed inside the '⊂'-shaped hollow on one portion of the gate electrode 21a at the fixed interval from the source electrode 22a. In this process, the '⊂'-shaped channel region is formed between the source electrode 22a and the drain electrode 22b, and the active layer 23 is larger than the combination of the data line 21, the source electrode 21 and the drain electrode 2b.

The passivation layer 27 formed on the lower substrate 20 contains an inorganic insulating material such as $Si_3N_4$ or $SiO_2$, or an organic insulating material such as acrylic organic compound, Teflon, Benzocyclobuten BCB, Cytop or Perfluorocyclobutane PFCB. After that, a photoresist layer (not shown) is deposited on the passivation layer 27 and then selectively patterned by exposure and developing processes. At this time, the photoresist layer is patterned to expose the passivation layer 27 above the drain electrode 22b and the storage upper electrode 22c of the preceding gate line 21.

As shown in FIG. 3C, the passivation layer 27 is etched by using the patterned photoresist layer as a mask (third mask), thereby forming the first contact hole 24a in one direction of the drain electrode 22b and the second contact hole 24b in one direction of the storage upper electrode 22c of the preceding gate line 21. Then, a transparent electrode is deposited on the lower substrate 20, and a photolithography process is performed thereto, thereby forming the pixel electrode 25 in the pixel region including the first and second contact holes 24a and 24b. At this time, the pixel electrode 25 is formed of any one of Indium-Tin-Oxide ITO, Indium-Zinc-Oxide IZO, and Indium-Tin-Zinc-Oxide ITZO.

Second Embodiment

Figure 4:
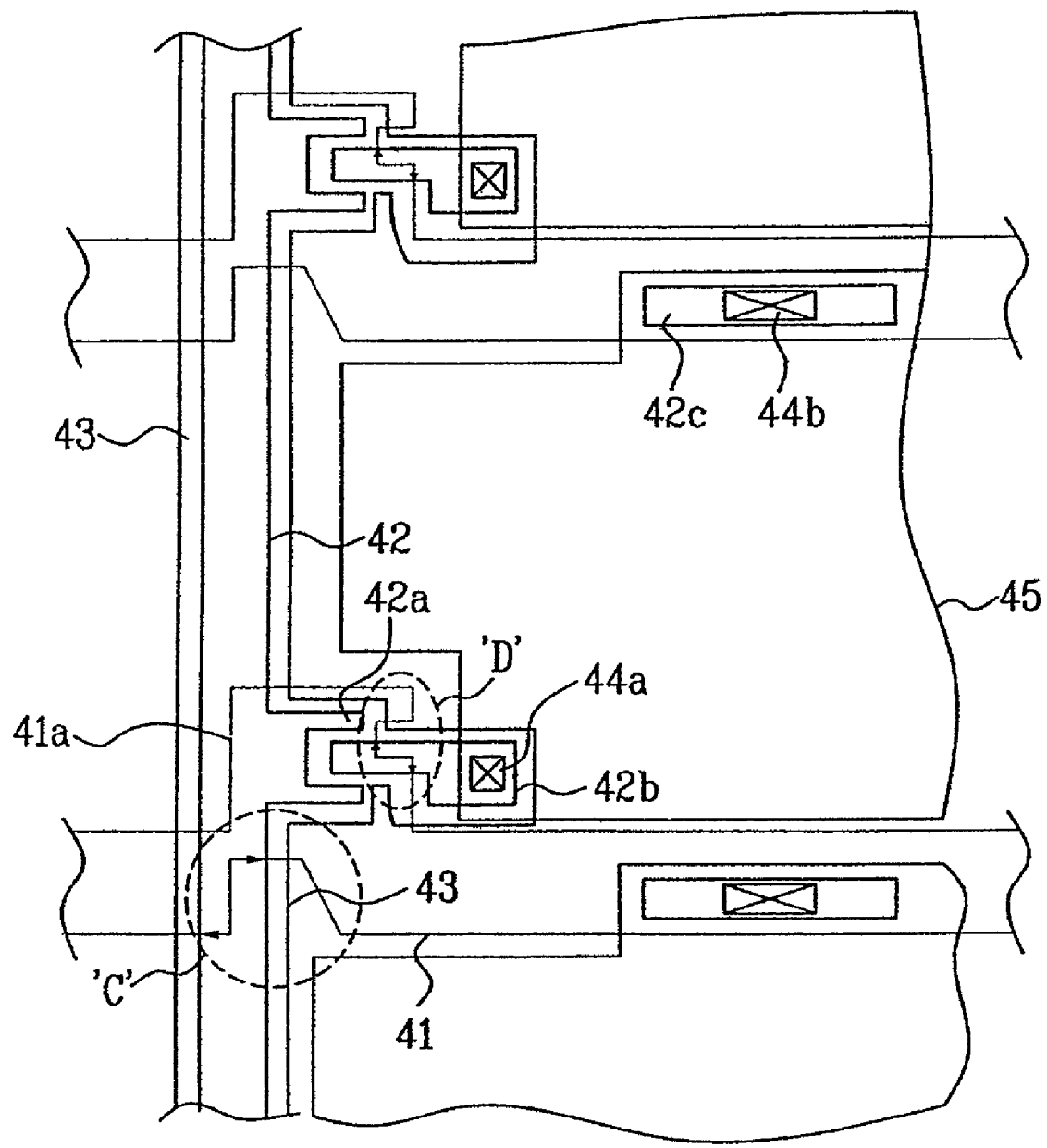
FIG. 4 is an enlarged plan view illustrating a unit pixel region of an LCD device according to the second embodiment of the present invention.
Figure 5A:
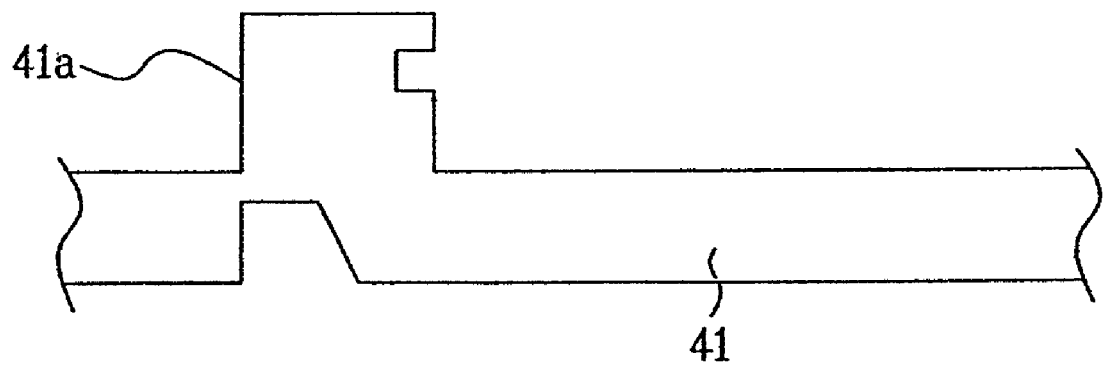
FIG. 5A to FIG. 5C are cross-sectional views illustrating manufacturing process steps of an LCD device according to the second embodiment of the present invention.
Figure 5A:
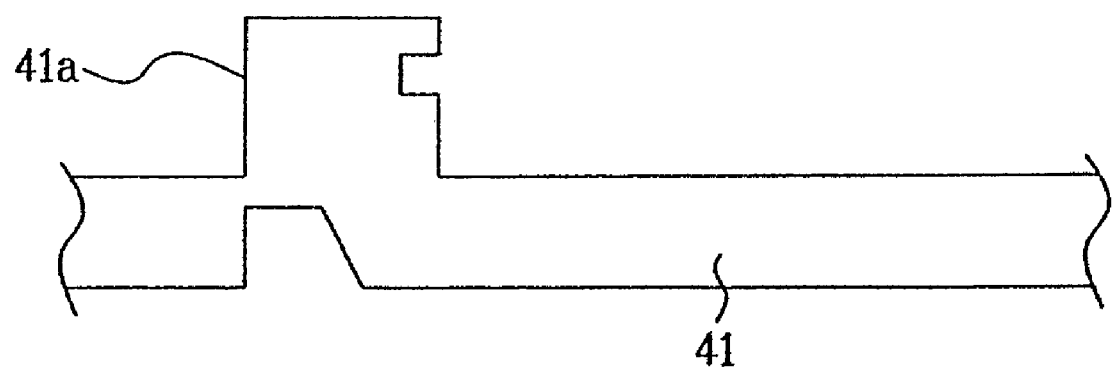
Figure 5B:
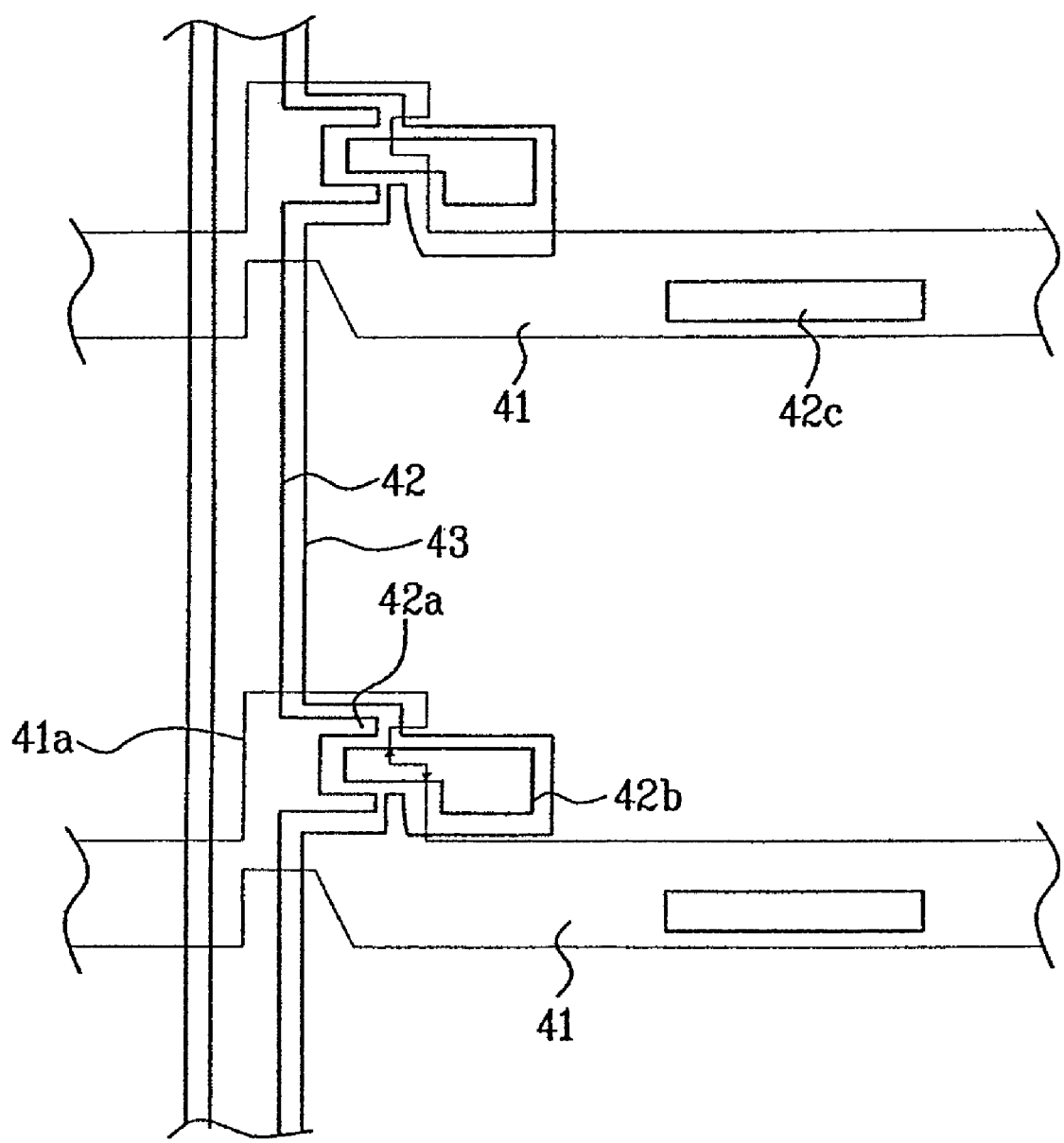
Figure 5C:
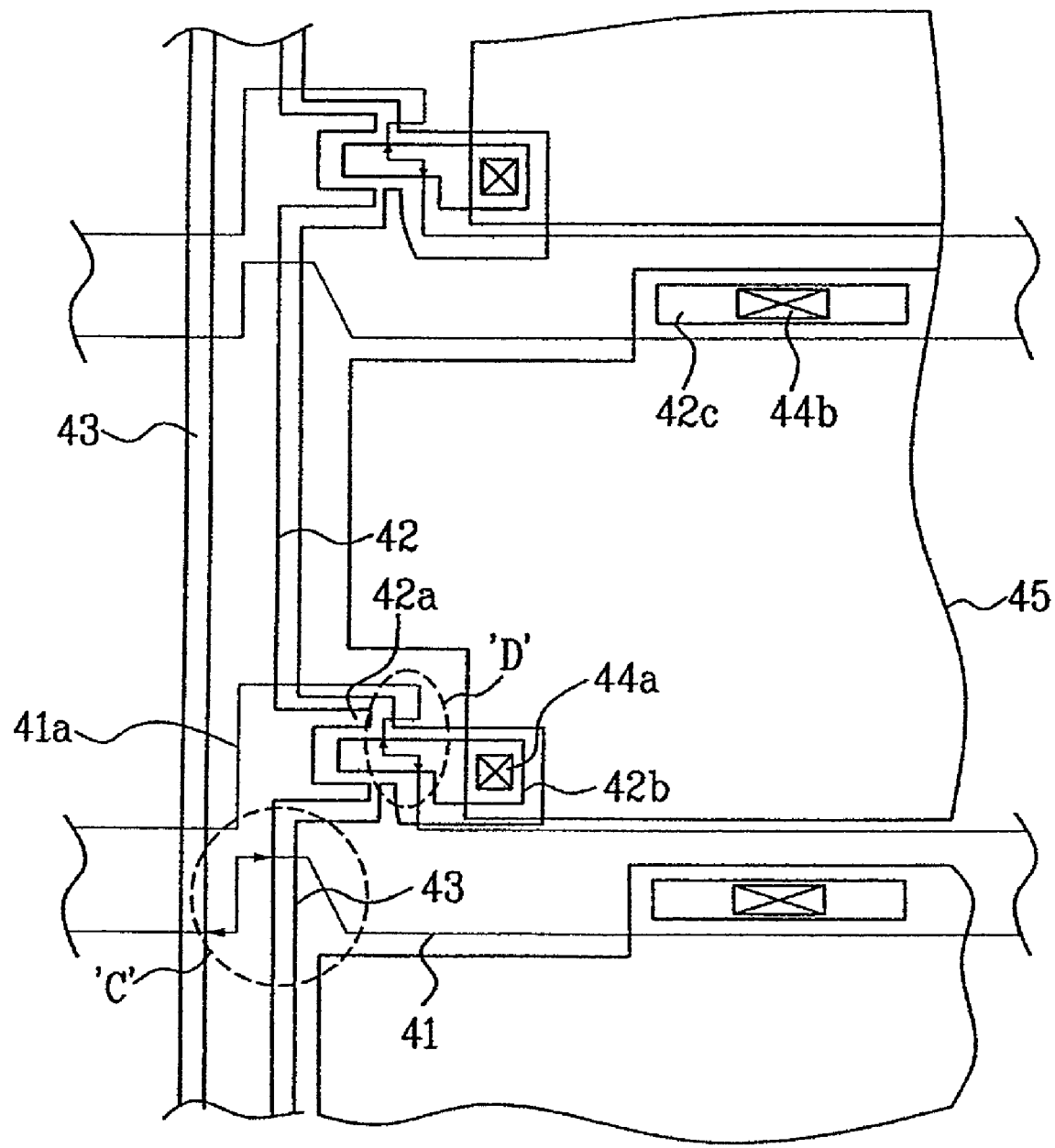

FIG. 4 is an enlarged plan view illustrating a unit pixel region of an LCD device according to the second embodiment of the present invention. FIG. 5A to FIG. 5C are cross-sectional views illustrating manufacturing process steps of an LCD device according to the second embodiment of the present invention. In addition to the structure of the LCD device according to the first embodiment of the present invention, a gate electrode has a predetermined portion being bent inwardly to increase an overlap boundary between the gate and drain electrodes.

Hereinafter, an LCD device according to the second embodiment of the present invention will be described as follows.

As shown in FIG. 4 illustrating the unit pixel region of the LCD device according to the second embodiment of the present invention, a gate line 41 is arranged at a fixed interval in one direction on a transparent lower substrate (not shown in this figure), and a gate electrode 41a projects from the gate line 41 in one direction. A storage lower electrode of a storage capacitor is formed in one body as the preceding gate line 41. That is, the preceding gate line 41 serves as the storage lower electrode. Then, a gate insulating layer (not shown in this figure) is formed on the transparent lower substrate including the gate line 41 and the gate electrode 41a. Also, a data line 42 is formed on the gate insulating layer perpendicular to the gate line 41, thereby defining a pixel region. A source electrode 42a projects from the data line 42 and a drain electrode 42b is formed at a fixed interval from the source electrode 42a. The source electrode 42a is formed in a '⊂'-shaped hollow and the drain electrode 42b is formed inside the '⊂'-shaped hollow at the fixed interval from the source electrode 42a.

The gate line 41 is bent angularly and inwardly at a lower crossing boundary between the gate and data lines 41 and 42 as above. The gate line 41 may be formed, for example, in a curved line at the lower crossing boundary. On comparing the 'C' region of FIG. 4 to the 'A' region of FIG. 1, the lower crossing boundary between the gate and data lines 41 and 42 in the unit pixel of the LCD device according to the second embodiment is longer than that according to the related art. In the portion of the gate line 41 that is bent angularly and inwardly, some parts are overlapped with the data line 42, and the rest are not overlapped with the data line 42. In the aforementioned structure of the LCD device, even though the gate electrode 41a is shifted, it is possible to compensate the crossing area between the gate and data lines 41 and 42 due to the bent portion of the lower crossing boundary, thereby minimizing the Cgd change.

Also, the gate electrode 41a has a predetermined portion that is bent angularly and inwardly at an overlap boundary between the gate electrode 41a and the drain electrode 42b. Accordingly, when comparing the 'D' region of FIG. 4 to the 'B' region of FIG. 1, the overlap boundary between the gate electrode 41a and the drain electrode 42b in the unit pixel region of the LCD device according to the second embodiment is longer than that according to the related art to prevent opening of the drain electrode 42b at the crossing area between the gate electrode 41a and the drain electrode 42b. As above, the bent portion of the gate electrode 41a may be formed in numerous other ways including a curved line.

A '⊂'-shaped channel region is defined between the source electrode 42a and the drain electrode 42b. Also, an active layer 43 having a predetermined shape is patterned on the gate insulating layer. The active layer 43 is formed below the data line 42, the source electrode 42a and the drain electrode 42b and is wider than the data line 42, the source electrode 42a and the drain electrode 42b. That is, the size of the active layer 43 is larger than the size of the data line 42, the source electrode 42a and the drain electrode 42b. The active layer 43 is formed by sequentially depositing an amorphous silicon layer and n+ amorphous silicon layer. Then, a storage upper electrode 42c is formed at one portion of the preceding gate line 41 serving as the storage lower electrode.

Next, a passivation layer (not shown in this figure) is formed on an entire surface of the lower substrate. The passivation layer has a first contact hole 44a at one portion of the drain electrode 42b and a second contact hole 44b at one portion of the storage upper electrode 42c. Then, a pixel electrode 45 is formed in the pixel region that is in contact with the drain electrode 42b through the first contact hole 44a and in contact with the storage upper electrode 42c through the second contact hole 44b. The data line 42 is formed of one or more conductive materials such as chrome Cr, molybdenum Mo, titanium Ti and tantalum Ta, or molybdenum Mo alloys such as MoW, MoTa and MoNd. The passivation layer 42 is formed of an inorganic insulating material such as silicon nitride $Si_3N_4$ or silicon dioxide $SiO_2$, or an organic insulating material such as acrylic organic compound, Teflon, Benzocyclobuten BCB, Cytop or Perfluorocyclobutane PFCB. Also, the pixel electrode 45 is formed of any one of Indium-Tin-Oxide ITO, Indium-Zinc-Oxide IZO, and Indium-Tin-Zinc-Oxide ITZO.

A method for manufacturing the aforementioned LCD device according to the second embodiment of the present invention will be described as follows.

As shown in FIG. 5A, a conductive material such as chrome Cr, aluminum Al, an aluminum alloy such as AlNd, tantalum Ta and molybdenum Mo is deposited on the lower substrate (not shown in this figure), and then a patterning process is performed thereon with a first mask by photolithography, thereby forming the gate line 41 arranged in one direction and the gate electrode 41a projecting from the gate line 41 in another direction. The gate line 41 is angularly and inwardly bent at the lower crossing boundary between the gate line 41 and the data line 45, so that the lower crossing boundary becomes longer than in the related art. As a result, it is possible to prevent the data line 42 from being corroded by an etchant at the crossing area overlapped with the gate line 41, thereby preventing disconnection of the lines. As above, the gate line 41 may be formed in numerous shapes such as a curved line at the lower crossing boundary.

In the portion of the gate line 41 that is bent angularly and inwardly, some parts are overlapped with the data line 42, and the rest are not overlapped with the data line 42. In the aforementioned structure of the LCD device, even though the gate electrode 41a is shifted, it is possible to compensate the crossing area between the gate and data lines 41 and 42 by the bent portion of the lower crossing boundary, thereby minimizing the Cgd change.

Also, the gate electrode 41a has the predetermined portion that is bent angularly and inwardly at the overlap boundary between the gate electrode 41a and the drain electrode 42b. Accordingly, the overlap boundary between the gate electrode 41a and the drain electrode 42b in the unit pixel region of the LCD device according to the second embodiment of the present invention is longer than that according to the related art, whereby it is possible to prevent the drain electrode 42b from being corroded by the etchant at the overlap boundary overlapped with the gate electrode 41a, thereby preventing disconnection. The bent portions of the gate line 41 and the gate electrode 41a may be formed in numerous shapes such as curved lines.

The conductive layers may have a dual-layered structure having lower and upper layers. For example, the lower layer of the conductive metal layer may be formed of Al or AlNd and the upper layer of the conductive layer formed of Mo. Or, the lower layer of the conductive layer may be formed of Cr and the upper layer of the conductive layer formed of AlNd. After that, the gate insulating layer (not shown in this figure) is formed on the entire surface of the lower substrate including the gate line 41.

Hereinafter, the structures shown in FIG. 5B and FIG. 5C are same as those according to the first embodiment of the present invention.

Third Embodiment

Figure 6:
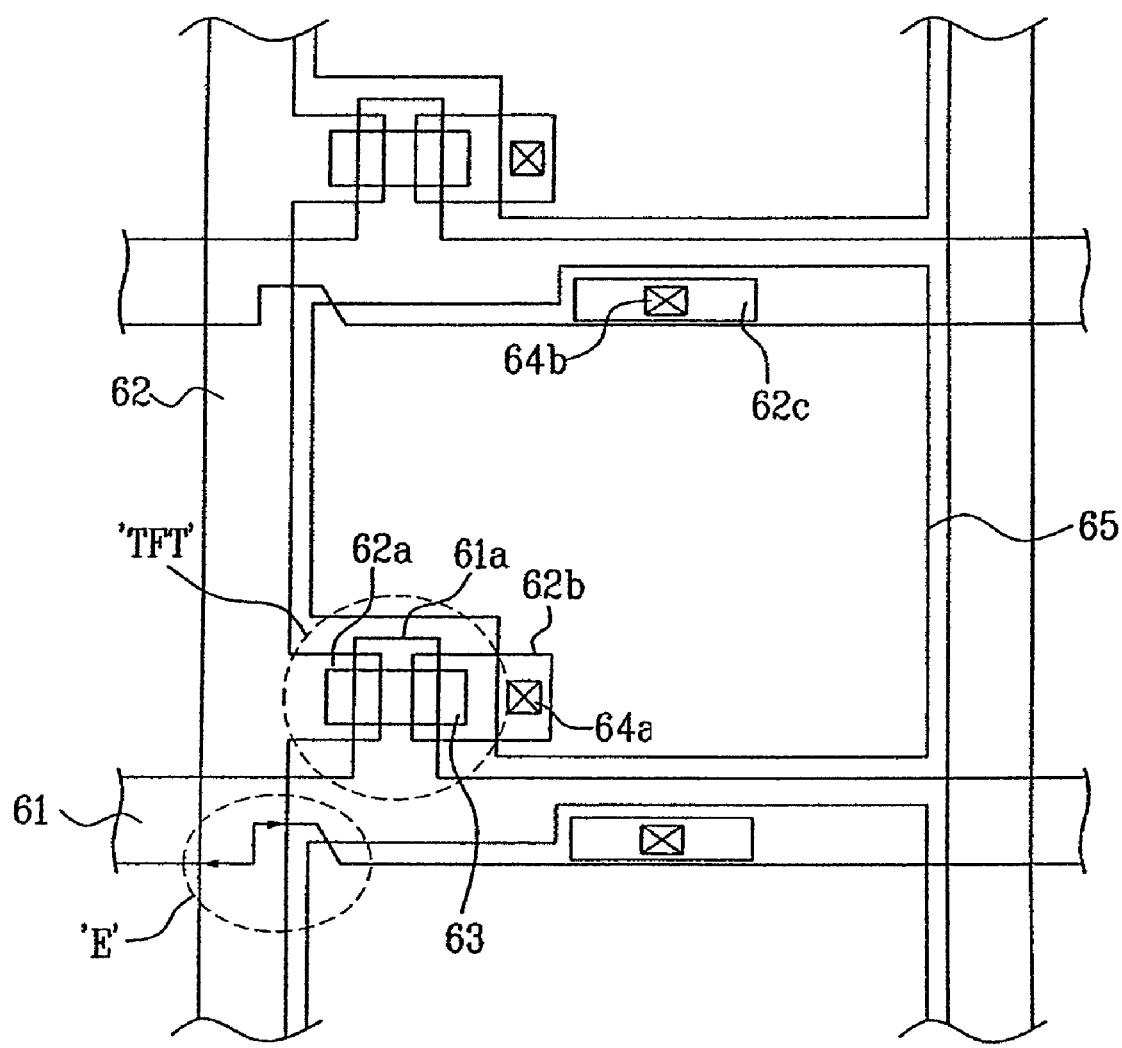
FIG. 6 is an enlarged plan view illustrating a unit pixel region of an LCD device according to the third embodiment of the present invention.

FIG. 6 is an enlarged plan view illustrating a unit pixel region of an LCD device according to the third embodiment of the present invention. As shown in FIG. 6 illustrating the unit pixel region of the LCD device according to the third embodiment of the present invention, a gate line 61 is formed at a fixed interval in one direction on a lower substrate (not shown in this figure), and a gate electrode 61a projects from the gate line 61 in one direction. Then, a storage lower electrode is formed in one body as the gate line 61 at a position corresponding to a storage capacitor of the preceding gate line.

The gate line 61 is bent angularly and inwardly at a lower crossing boundary between the gate and data lines 61 and 62. That is, the lower crossing boundary between the gate and data lines 61 and 62 in region 'E' in the unit pixel of the LCD device according to the third embodiment of the present invention is longer than that according to the related art. Thus, it is possible to prevent the data line 62 from being corroded by an etchant at the crossing area that overlaps the gate line 61, thereby preventing disconnection of the lines. In the portion of the gate line 61 bent angularly and inwardly, some parts are overlapped with the data line 62, and the rest are not overlapped with the data line 62.

Although not shown, a gate pad is formed at one end of the gate line 61 and a source pad is formed at another end of the data line 62. Also, a gate insulating layer (not shown in this figure) is formed on the lower substrate including the gate line 61, the gate electrode 61a and the storage lower electrode, for electrically insulating the gate line 61, the gate electrode 61a and the storage lower electrode from an upper layer. Then, an active layer 63 is formed on the gate insulating layer above the gate electrode 61a. The active layer 63 is formed by sequentially depositing an amorphous silicon layer 63a and a doped amorphous silicon layer 63b.

Then, the data line 62 is formed perpendicular to the gate line 61, thereby forming a pixel region. A source electrode 62a projects from the data line 62 in one direction and overlaps one side of the active layer 63. A drain electrode 62b is formed at a fixed interval from the source electrode 62a and overlaps the other side of the active layer 63. After that, a storage upper electrode 62c is formed above the storage lower electrode. Also, a passivation layer (not shown in this figure) is formed on the lower substrate, the passivation layer having first and second contact holes 64a and 64b corresponding to the drain electrode 62b and the storage upper electrode 62c. A pixel electrode 65 is formed in the pixel region and is in contact with the drain electrode 62b and the storage upper electrode 62c through the first and second contact holes 64a and 64b.

As mentioned above, the LCD device and method for manufacturing the same has the following advantages.

First, the gate line is bent angularly and inwardly at the lower crossing boundary overlapped with the data line, thereby increasing the lower crossing boundary between the gate and data lines. Thus, it is possible to prevent the data line from being open at the crossing area between the gate and data lines.

Also, a predetermined portion of the gate electrode overlapped with the drain electrode is bent angularly and inwardly, thereby increasing the overlap boundary between the gate and drain electrodes. Thus, it is possible to prevent the drain electrode from being open at the overlap area between the gate and drain electrodes.

Thus, the Cgd change is minimized even though the gate electrode is shifted, thereby preventing signal distortion.

Fourth Embodiment

Figure 7:
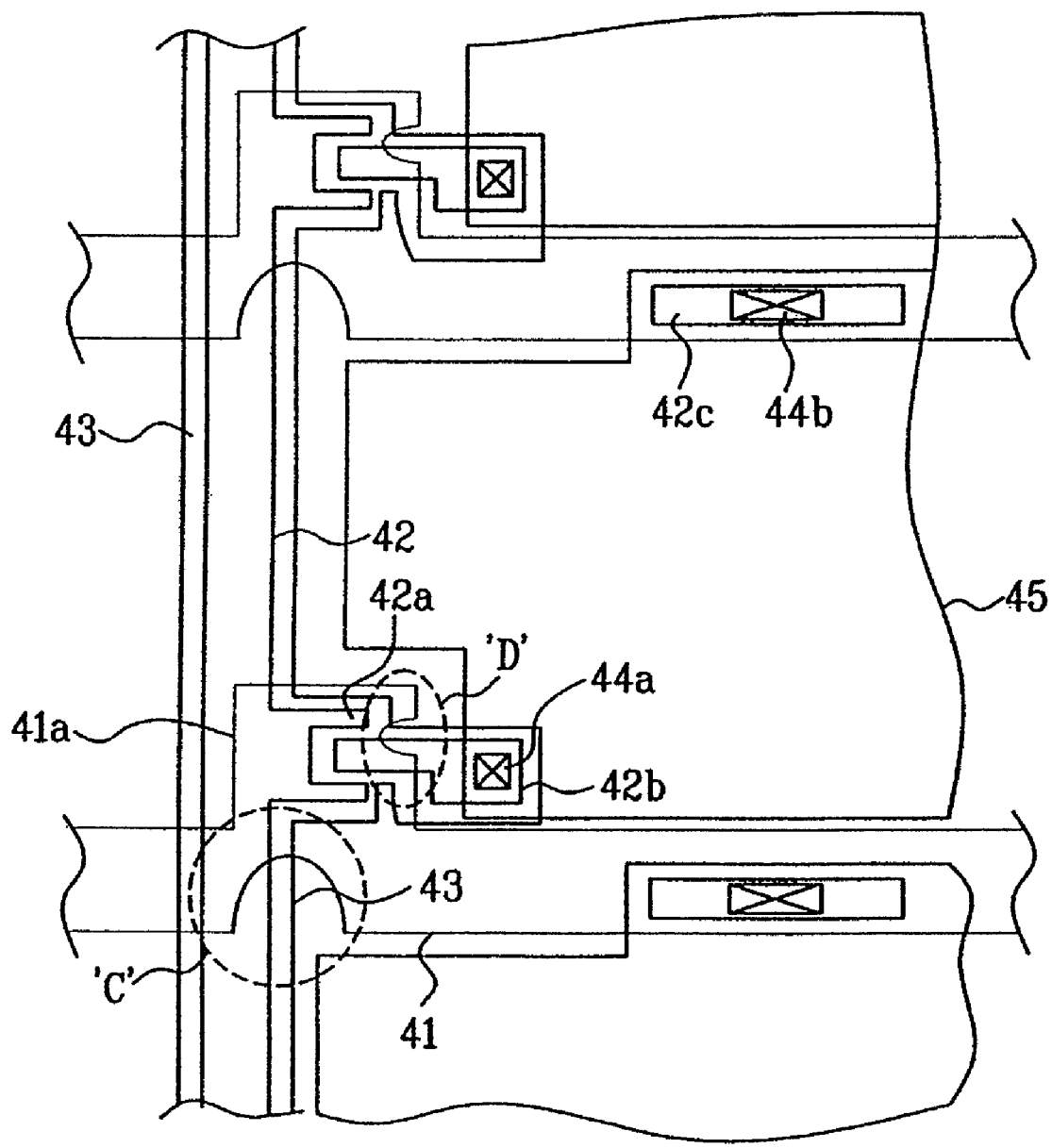
FIG. 7 is an enlarged plan view illustrating a unit pixel region of an LCD device according to the fourth embodiment of the present invention.

FIG. 7 is an enlarged plan view illustrating a unit pixel region of an LCD device according to the third embodiment of the present invention. As shown in FIG. 7, the fourth embodiment is similar to the second embodiment of the invention and may be formed in a similar manner. In the fourth embodiment, however, at least one of the gate line 41 is curved at a lower crossing boundary between the gate and data lines 41 and 42 and the gate electrode 41a is curved at an overlap boundary between the gate electrode 41a and the drain electrode 42b.

As mentioned above, the LCD device and method for manufacturing the same has the following advantages.

First, the gate line is curved at the lower crossing boundary overlapped with the data line, thereby increasing the lower crossing boundary between the gate and data lines. Thus, it is possible to prevent the data line from being open at the crossing area between the gate and data lines.

Also, a predetermined portion of the gate electrode overlapped with the drain electrode is curved, thereby increasing the overlap boundary between the gate and drain electrodes. Thus, it is possible to prevent the drain electrode from being open at the overlap area between the gate and drain electrodes.

Thus, the Cgd change is minimized even though the gate electrode is shifted, thereby preventing signal distortion.

It will be apparent to those skilled in the art that various modifications and variations can be made in the embodiments of the present invention. Thus, it is intended that the present invention covers the modifications and variations of the third embodiment described and illustrated provided they come within the scope of the appended claims and their equivalents.

What is claimed is:

1. A method for manufacturing an LCD device comprising:
forming a gate line arranged in one direction on a substrate, the gate line having a predetermined portion concaved angularly and inwardly on a bottom of the gate line; forming a gate electrode projecting from the gate line; sequentially depositing a gate insulating layer, a semiconductor layer and a conductive layer on the substrate including the gate line; etching the conductive layer to form a data line overlapped with some of the concaved portion of the gate line, thereby defining a pixel region, the data line perpendicular to the gate line; forming a source electrode projecting from the data line; forming a drain electrode at a fixed interval from the source electrode on the gate insulating layer; forming an active layer by etching the semiconductor layer with the data line, the source electrode and the drain electrode as a mask; and forming a pixel electrode in the pixel region, wherein a boundary of the bottom of the gate line that overlaps the data line is greater than a width of the data line, and wherein said predetermined portion concaved angularly and inwardly on a bottom of the gate line is located in a single pixel region.

2. The method of claim 1, wherein a predetermined portion of the gate electrode is bent angularly and inwardly.

3. The method of claim 2, wherein the drain electrode is overlapped with some of the bent portion of the gate electrode.

4. The method of claim 1, wherein at least a section of the bent portion of the gate line is curved.

5. The method of claim 2, wherein at least a section of the bent portion of the gate electrode is curved.

6. The method of claim 3, wherein a boundary of the gate electrode that overlaps the drain electrode is greater than a width of the drain electrode.

7. A method for manufacturing an LCD device comprising:
forming a gate line arranged in one direction on a substrate, the gate line having a notch portion concaved angularly and inwardly on a bottom of the gate line; forming a gate electrode projecting from the gate line; sequentially depositing a gate insulating layer, a semiconductor layer and a conductive layer on the substrate including the gate line; etching the conductive layer to form a data line overlapped with some of the notch portion of the gate line, thereby defining a pixel region, the data line perpendicular to the gate line; forming a source electrode projecting from the data line; forming a drain electrode at a fixed interval from the source electrode on the gate insulating layer; forming an active layer by etching the semiconductor layer with the data line, the source electrode and the drain electrode as a mask; and forming a pixel electrode in the pixel region, wherein a boundary of the bottom of the gate line that overlaps the data line is greater than a width of the data line, and wherein said notch portion concaved angularly and inwardly on a bottom of the gate line is located in a single pixel region.

8. The method of claim 7, wherein the gate electrode has a notch portion, and the drain electrode is overlapped with some of the notch portion of the gate electrode.

9. The method of claim 8, wherein at least a section of the notch portion of the gate electrode is curved.

10. The method of claim 8, wherein a boundary of the gate electrode that overlaps the drain electrode is greater than a width of the drain electrode.

11. The method of claim 7, wherein at least a section of the notch portion of the gate line is curved.

* * * * *